United States Patent [19]
Harris

[11] 3,897,722
[45] Aug. 5, 1975

[54] FOOD PREPARATION DEVICE FOR USE WITH A COOKING GRILL

[76] Inventor: Frank D. Harris, P.O. Box 86, Homosassa Springs, Fla. 32647

[22] Filed: Nov. 19, 1973

[21] Appl. No.: 417,114

[52] U.S. Cl. ............... 99/345; 248/282; 248/311
[51] Int. Cl.² .......................................... A47J 27/52
[58] Field of Search .......... 99/345; 248/226 A, 282, 248/283, 311

[56] References Cited
UNITED STATES PATENTS
| | | | |
|---|---|---|---|
| 1,460,486 | 7/1923 | Harvey | 99/345 |
| 3,448,956 | 6/1969 | Kuhaneck | 248/311 |

FOREIGN PATENTS OR APPLICATIONS
| | | | |
|---|---|---|---|
| 364,466 | 11/1922 | Germany | 99/345 |
| 680,625 | 2/1964 | Canada | 248/311 |

*Primary Examiner*—Harvey C. Hornsby
*Attorney, Agent, or Firm*—Cushman, Darby & Cushman

[57] ABSTRACT

A food preparation device used for the basting of food is provided whereby the device is pivotally secured to the rim of an outdoor home cooking grill. The device utilizes a basting container that is pivotally engaged with an upwardly extending support rod which is pivotally engaged with the rim of the cooking grill. Movement of the support rod or the pivotally connected container will enable selective positioning of the container for best advantage in basting and heat control of the contents of the container and allow a cook to baste foods with one hand while having the other hand free to turn or otherwise tend the food.

8 Claims, 4 Drawing Figures

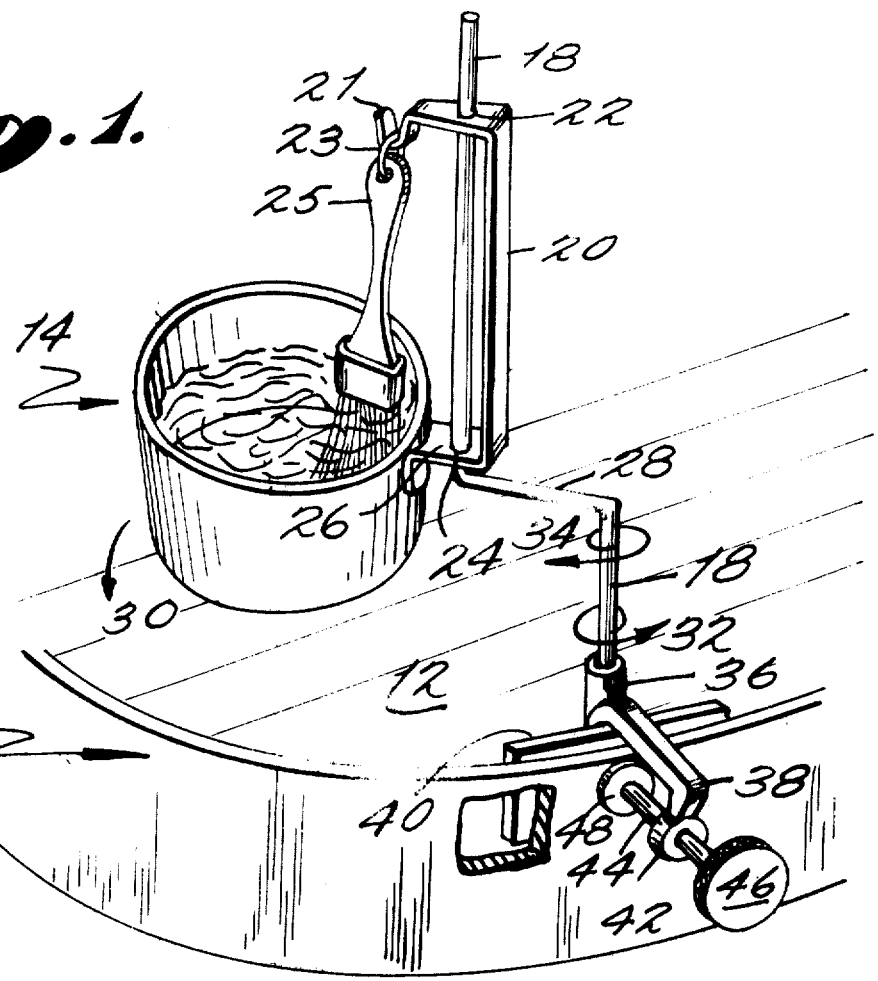
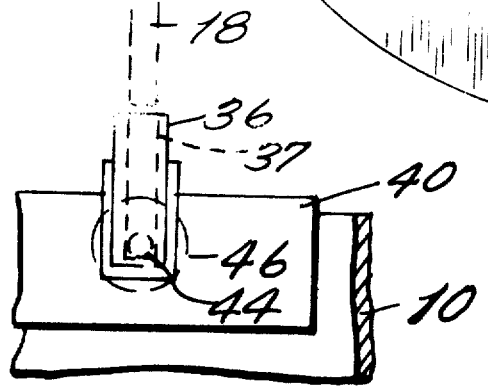
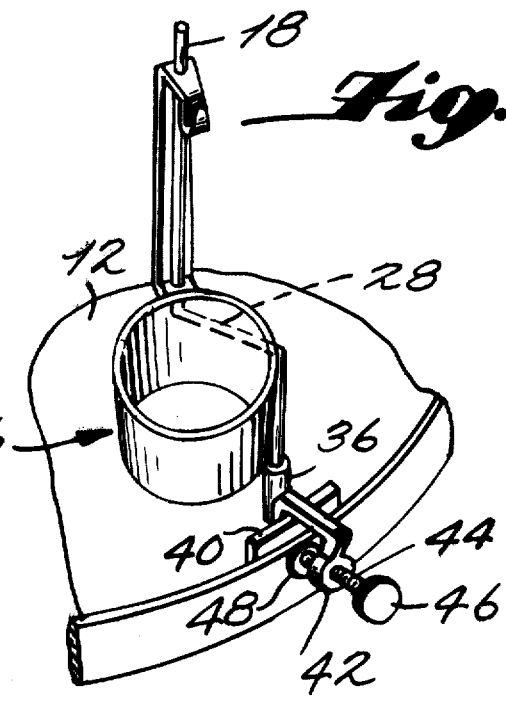
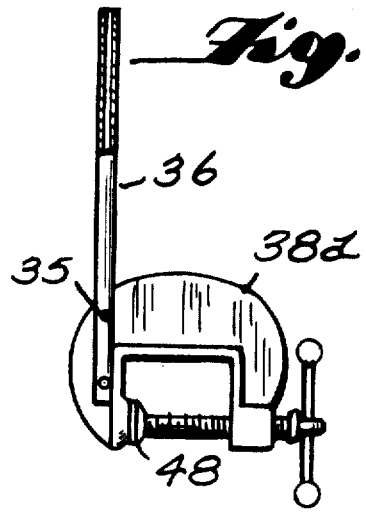

FOOD PREPARATION DEVICE FOR USE WITH A COOKING GRILL

BACKGROUND OF THE INVENTION

This invention relates to the field of cooking devices and more particularly to a cooking device which has attached thereto a container used with an applicator for basting foods. When an outdoor cooking device such as a bowl-shaped charcoal grill is used, it is often desired to moisten or baste the foods being cooked thereupon with butter, oil, barbecue sauce, etc. However, in order for a cook to baste such foods, he must first free his hands from using other cooking utensils such as a spatula or turning fork before he can use a container having a basting fluid. Typically a cook, in performing the basting function, must grasp the container with one hand and utilize an applicator such as a brush with the other hand in order to apply the basting liquid to the food. After he has completed basting the food he must then place the basting container and applicator elsewhere so that he may be able, once again, to pick up a spatula in order to turn over or otherwise tend to food being prepared over the charcoal fire. As is often the case when outdoor cooking is involved, the container holding the basting liquid is placed on the ground where contamination may result, or the container is placed on a distant table resulting in inconvenience.

The present invention in its preferred embodiment contemplates the use of an outdoor cooking grill having a bowlshaped configuration in which a food preparation device is attached to the rim of the bowl-shaped configuration. This food preparation device is adapted to pivotally secure a basting container. The device as disclosed by this novel invention is a handy container and applicator for butter, oil, barbecue sauce, and similar preparations for basting food on a popular home charcoal grill. The basting device is attached to the rim of the grill and permits the container to be selectively positioned for best advantage in basting and to swing over or away from the fire to permit heat control, while also allowing the cook to have both hands free to baste and turn or otherwise tend to the food. Such a device thus eliminates the need for the cook to drop his cooking utensils in order to pick up the basting container and applicator in order to properly baste the food being cooked.

A further advantage of the present food preparation device is the employment of a basting container being pivotally attached to a rod wherein the rod is also pivotally attached to the rim of the charcoal cooking grill. Such a configuration results in the basting container adapted to be heated over a hot portion of the charcoal fire or alternatively the basting container may be swung on a horizontal arc away from the fire so that the contents of the basting container may be cooled. Also, the exemplary embodiment of the invention contemplates the use of the applicator being removably secured to the handle of the basting container such that the applicator may be readily removed from the container.

SUMMARY OF THE INVENTION

It is therefore an object of the present invention to provide a food preparation device that can be readily adapted to a typical home outdoor cooking grill.

It is another object of the present invention to provide a basting container that is adapted to be heated over the cooking grill and subsequently removed from the heat without detaching the container from the rim of the cooking grill.

It is yet another object of the present invention to provide a food preparation device that will enable a cook to utilize one hand for basting food while utilizing the other hand for turning over or otherwise tending the food.

It is yet a further object of the present invention to provide a food preparation device which may be constructed of relatively inexpensive materials.

It is another object of the present invention to provide a food preparation device which enables a basting container to have different degrees of heat applied to it by pivotally rotating said basting container with respect to the heat supplied from the cooking fire.

It is yet another object of the present invention to provide a basting container that can be variably positioned by means of a rod over the grill to best advantage in basting.

It is another object of the present invention to provide a basting container that is removably supported by the rod so that it may be removed for such purposes as changing the contents without disturbance to the remainder of the device.

Additional objects of the present invention reside in the specific construction of the exemplary apparatus hereinafter particularly described in the specification and shown in the several drawings.

BRIEF DESCRIPTION OF THE DRAWINGS

Novel features of the improved device in accordance with the present invention will be more readily understood from a consideration of the following description taken together with the accompanying drawings, in which certain preferred adaptations are illustrated with the various parts thereof identified by suitable reference characters in each of the views, and in which:

FIG. 1 diagrammatically illustrates the preferred embodiment of the present invention and further shows how the supporting rod may be pivotally displaced;

FIG. 2 illustrates the displacement of the basting container with respect to the supporting rod wherein the basting container is located proximate to the rim;

FIG. 3 is a diagrammatic view of the securement means; and

FIG. 4 illustrates another embodiment in which a clamp is secured to the supporting tube by means of rivets.

DETAILED DESCRIPTION OF THE INVENTION

The exemplary embodiment of the present invention is shown in FIG. 1 and contemplates the use of a well-known bowl-shaped outdoor cooking grill having a rim 10 and an interior heated portion 12 used in combination with a food preparation device generally designated at 14. The food preparation device comprises a container 16 which is utilized to hold a basting liquid such as oil, butter, or barbecue sauce, wherein the basting container 16 is pivotally secured to a main support means which in the preferred embodiment comprises a metal rod 18. The container or vessel 16 has a handle 20 which is provided with two apertures 22 and 24 through which the rod 18 extends enabling the handle 20 to pivot with respect to the rod 18.

The apertures 22 enable the handle 20 and hence the container 16 to be removed from the rod 18 so that contents of the container 16 may be changed, if so desired.

The bottom portion of the handle 26 rests against a horizontal bent configuration 28 of the rod 18. The bottom portion of the handle 26 is arranged on the container or vessel 16 so that when the container is pivoted in a horizontal arc indicated by the arrow 30, the container 16 will eventually be disposed against the bent portion 28. When the container 16 is rotated in such a direction while the rod 18 is retained stationary it becomes apparent that the vessel 16 may be displaced from a rather hot portion of the fire to a cooler portion near the rim 10. Furthermore, by rotating the bottom portion of the rod 18 in the direction of arrow 32 it can be seen that the container 16 may be swung outwardly away from the fire completely. On the other hand if the rod 18 is pivoted in the direction of the arrow 34 the vessel 16 will be displaced closer to the hot portion of the fire, but of course can be continued in the direction 34 so as to be removed outwardly of the rim 10.

FIG. 2 shows a diagrammatic view in which the vessel 16 has been pivotally displaced against the horizontal bent configuration 28 of the rod 18 so that the vessel 16 may still be over a portion of the fire, but closer to the rim 10 where the heat is not so great.

Returning to FIG. 1, there is disclosed a securement means which comprises a tube 36. This tube has a closed bottom-end which serves as a bearing-support for rod 18 which is pivotally inserted therein. Attached to the tube 36 is a clamp 38 which has one end welded or otherwise attached to a plate 40. Helically secured through a threaded means 42 attached to the clamp 38 is a shank 44 which may be displaced inwardly or outwardly through the threaded means 42 by means of a rotatable thumb screw 46. Located at the opposite end of the threaded shank 44 is a rim abutting disc 48 which is adapted to fit snugly against the rim exterior 10. It can readily be appreciated that the thumb screw 46 is adapted to remove the securing means in a matter of a few seconds.

It is further contemplated that the securement means may comprise a spring clip or a U-block with a winged screw instead of a thumb screw 46 as a tightening mechanism. In FIG. 4 there is shown a further embodiment of the present invention. A typical C-clamp 38a of durable metal is shown secured to the tube 36 by means of rivets 35, but could also be secured by use of bolts or welding or any other well-known method.

In FIG. 3, there is shown a diagrammatic view of the end of the rod 18 being inserted into the tube 36. Tube 36 is of metal and has a bore 37 which allows a relatively snug fit of the rod 18 yet has a diameter sufficient to allow the rod 18 to be easily pivoted within the tube 36. The plate 40 which abuts against the interior of the rim 10 is preferably constructed of steel and may be welded to the steel clamp 38 and the steel tube 36. Thus, the assembled securement means provides a rigid yet relatively inexpensive device to secure and pivotally connect the rod 18 having a bent portion 28 to the rim 10.

Located at one end of the handle 20, is an upwardly turned portion 21 which is adapted to receive a holding ring 23 secured to the handle of an applying means 25 which would typically be a brush. From a viewing of the drawings it can be readily appreciated that the brush is adapted to hang in a position so that its bristles or applying portion extend into the heated basting liquid.

Thus when it is determined that the basting liquid is of sufficient temperature to be applied to food being cooked, the brush can be easily saturated with such basting liquid and used to apply the oil, etc., to the food. After such use, the brush 25 may be returned by means of the ring 23 to the loop portion 21, thus freeing the cook to perform other functions.

It is to be noted that the exemplary embodiment contemplates the use of a typical household pot with holes drilled through the handle of the pot, but if such a handle is not long enough or cannot be easily bent as described in the drawing, a handle extension could readily be constructed with the necessary holes.

The food preparation device as herein described could be constructed of different yet similar components and it should be remembered that the foregoing specific embodiment has been described for the purpose of illustrating the principles of the present invention and the same is subject to modification without departure therefrom. Therefore, the invention includes all modifications within the spirit and scope of the appended claim.

What is claimed is:

1. A food preparation device to be used with a cooking means, said cooking means having an interior heated portion at least partially surrounded by a rim in which said device comprises:
   a. a main support means;
   b. securing means pivotally connecting said support means adjacent to the rim for disposing said support means upwardly from the rim, said securing means being mounted adjacent to the rim;
   c. a container means for holding a liquid to be applied to a food pivotally attached to said support means; and
   d. means for applying the liquid to food being cooked in the cooking means, said applying means being supported by said support means and at least partially confined by said container and readily removable therefrom; said pivotally connected support means arranged to dispose said container interiorly and exteriorly of the rim in a plane substantially parallel to a top surface of the cooking means.

2. The device of claim 1 wherein said support means comprises a rod having a bent configuration.

3. The device of claim 2 wherein said securing means includes a tube secured thereto, said support means having one end thereof pivotally inserted in said tube.

4. The device of claim 3 wherein said container means comprises a vessel having a handle, said handle being pivotally connected to said rod, wherein pivotal movement of said handle with respect to said rod is defined by a predetermined horizontal arc.

5. The device of claim 4 wherein said horizontal arc is predetermined by the bent configuration of said rod.

6. The device of claim 5 wherein said handle has at least one aperture through which said rod is inserted so that said rod and handle are pivotally connected.

7. The device of claim 6 wherein said securing means additionally comprises a thumb screw having a shank helically secured to a clamping means in which said clamping means is arranged to hold said tube in rigid relationship with respect to the rim when said shank is screwed inwardly against the rim by means of said thumb screw.

8. The device of claim 7 wherein said applying means comprises a brush removably secured adjacent to said handle so that said brush may be soaked with a liquid from said container and removed therefrom.

* * * * *